(12) United States Patent
Maekawa

(10) Patent No.: US 8,245,545 B2
(45) Date of Patent: Aug. 21, 2012

(54) MOTOR CONTROLLER AND WASHING MACHINE

(75) Inventor: Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1128 days.

(21) Appl. No.: 12/053,808

(22) Filed: Mar. 24, 2008

(65) Prior Publication Data

US 2009/0056385 A1     Mar. 5, 2009

(30) Foreign Application Priority Data

Sep. 5, 2007   (JP) ................. 2007-230634

(51) Int. Cl.
*D06F 33/00*   (2006.01)
(52) U.S. Cl. ............... 68/12.16; 68/3 R; 8/158; 8/159
(58) Field of Classification Search ............ 68/12.16
See application file for complete search history.

(56) References Cited

U.S. PATENT DOCUMENTS

| | | | | |
|---|---|---|---|---|
| 2006/0127227 A1* | 6/2006 | Mehlhorn et al. | ............... | 417/53 |
| 2007/0145927 A1* | 6/2007 | Egami et al. | ............... | 318/432 |
| 2007/0145941 A1* | 6/2007 | Asada et al. | ............... | 318/811 |
| 2007/0200528 A1* | 8/2007 | Itou et al. | ............... | 318/719 |
| 2008/0042613 A1* | 2/2008 | Aizawa et al. | ............... | 318/778 |

FOREIGN PATENT DOCUMENTS

| | | |
|---|---|---|
| JP | 62-189993 | 8/1987 |
| JP | 02-051386 | 2/1990 |
| JP | 06-153585 | 5/1994 |
| JP | 07-107777 | 4/1995 |
| JP | 10-084691 | 3/1998 |
| JP | 2001-197769 | 7/2001 |
| JP | 2003-319698 A | 11/2003 |

OTHER PUBLICATIONS

Office Action issued Aug. 9, 2011, in Japanese Patent Application No. 2007-230634 (with English-language Translation).

* cited by examiner

*Primary Examiner* — Michael Barr
*Assistant Examiner* — Jason Ko
(74) *Attorney, Agent, or Firm* — Oblon, Spivak, McClelland, Maier & Neustadt, L.L.P.

(57) ABSTRACT

A motor controller includes a power converter energizing a motor based on a commutation signal, the motor including a rotor provided with a permanent magnet and a coil-wound stator; an estimator estimating rotor rotational speed and rotational position; a controller outputting the commutation signal to the power converter, the commutation signal taking a predetermined energization pattern based on a command rotational speed during startup, and being outputted based on the rotational position estimated by the estimator during position estimation; a current detector detecting current flowing in the coil winding; an input power calculator calculating input power of the motor by voltage applied to the coil winding and the current detected by the current detector; an output power calculator calculating output power of the motor by the rotational speed estimate; and a rotational abnormality determiner determining occurrence of rotational abnormality based on comparison of the input power with the output power.

7 Claims, 8 Drawing Sheets

MOTOR CONTROLLER AND WASHING MACHINE

CROSS-REFERENCE TO RELATED APPLICATIONS

This application is based upon and claims the benefit of priority from the prior Japanese Patent Application 2007-230639, filed on, Sep. 5, 2007 the entire contents of which are incorporated herein by reference.

FIELD

The present disclosure relates to a motor controller for controlling a motor provided with a permanent magnet mounted rotor; and more specifically to a motor controller that executes motor control based on estimated motor rotational speed and estimated motor rotational position. The present disclosure also relates to a washing machine provided with such motor controller.

BACKGROUND

Compressor motors and fan motors in air-conditioning applications and drive motors in electric automobile applications require extensive control of speed variation, reduction in electric power consumption, and improved maintenability. A sensor-less drive method is increasing its application as a solution to such requirements. A sensor-less drive method executes field-oriented control of a permanent magnet motor without dedicated sensors such as hall IC for detecting rotor positioning.

For instance, fan motors used in exterior units of air conditioners experience abnormal rotation in which the motor is locked unrotatably by external force or by internal disorders, and in some instances, experience significant reduction in rotational speed by reasons such as step-out. A sensor-less drive method, lacking a sensor for detecting rotor position, fails to directly detect such rotational abnormalities. To address such shortcomings, JP 2003-319698 A discloses a method of determining occurrence of abnormal rotation during position estimation. More specifically, the disclosed method evaluates the difference between the command angular frequency and the rotor angular frequency detected by zero-convergence of d-axis induced voltage.

The above described patent document describes a determiner for determining occurrence of rotational abnormalities during position estimation. The determiner determines occurrence of rotational abnormalities by referencing the estimated motor rotational speed or by induced voltage produced by a position estimator. The problem with such determiner was that extensive time is expended for detecting rotational abnormalities when precise estimate cannot be obtained or when sizable error occurs in estimate calculation.

SUMMARY

An object of the present disclosure is to provide a motor controller allowing prompt detection of motor rotation abnormalities even when the estimator fails to produce accurate estimate of motor rotational speed. Another object of the present disclosure is to provide a washing machine provided with such motor controller.

In one aspect, the present disclosure discloses a motor controller including a power converter that energizes a motor based on a commutation signal, the motor having a rotor including a permanent magnet and a coil-wound stator; an estimator that estimates a rotor rotational speed and a rotor rotational position; a controller outputting the commutation signal to the power converter, the outputted commutation signal taking a predetermined energization pattern based on a command rotational speed during startup, and being outputted based on the rotational position estimated by the estimator during position estimation; a current detector that detects current flowing in the coil winding; an input power calculator that calculates an input power of the motor by a voltage applied to the coil winding and the current detected by the current detector; an output power calculator that calculates an output power of the motor by the rotational speed estimated by the estimator; and a rotational abnormality determiner that determines occurrence of rotational abnormality based on comparison of the input power calculated by the input power calculator with the output power calculated by the output power calculator.

In another aspect, the present disclosure discloses a washing machine including a rotational tub accommodating laundry; a heat pump that includes a compressor housing a motor and that generates warm air; a re-circulator that re-circulates the warm air generated by the heat pump into the rotational tub; and the above described motor controller.

Yet, in another aspect, the present disclosure discloses a washing machine including a motor that exerts rotational drive force for wash, rinse, and dehydration; and the above described motor controller.

According to the above described configuration, occurrence of rotational abnormality is determined based on motor output power calculated by direct use of rotational speed estimate, and motor input power calculated by voltage and current without direct use of estimate. Thus, occurrence of rotational abnormality can be detected by abnormality observed in the relation between input power and output power caused by estimate errors. Hence, occurrence of rotational abnormalities at the motor can be detected promptly even when the estimator fails to obtain accurate motor rotational speed.

BRIEF DESCRIPTION OF THE DRAWINGS

Other objects, features and advantages of the present disclosure will become clear upon reviewing the following description of the embodiments with reference to the accompanying drawings, in which.

DETAILED DESCRIPTION

A description will be given hereinafter with reference to the drawings on a first exemplary embodiment applying the motor controller of the present disclosure to a washing machine.

Figure 4:
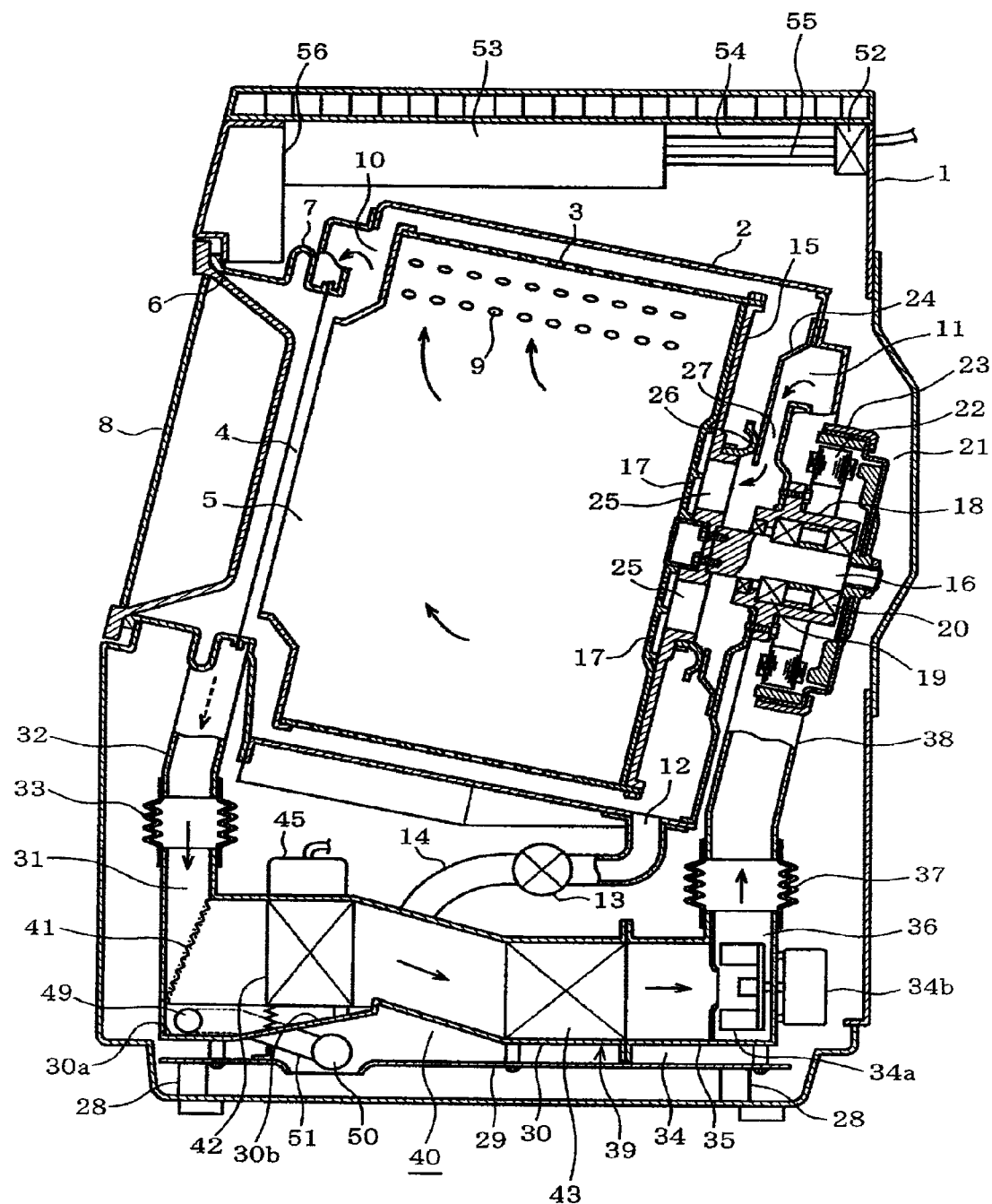
FIG. 4 is a vertical cross-sectional side view of a drum washer dryer.

FIG. 4 is a vertical cross sectional view of a drum typo (lateral axis) washer dryer containing a water tub 2 inside the cabinet 1. The water tub 2 contains a rotational tub (drum or dry compartment) 3. The cylindrical water tub 2 and the rotational tub 3 have openings 4 and 5 respectively in their front sides (left side in FIG. 4), and the opening 4 of the water tub 2 communicates with the opening 6 for loading and unloading of laundry defined in the front face of the cabinet 1 via bellows 7. An openable/closable door 8 is provided at the opening 6 the cabinet 1.

Perforations 9 are defined substantially throughout (though only a portion is shown) the periphery (waist) of the rotational tub 3. The perforations 9 function as water perforations during wash and dehydration and as air perforations during dry. A warm air outlet 10 is provided above the upper front-end side (portion above the opening 4) of the water tub 2 and a warm air inlet 11 is formed above the upper rear-end of the water tub 2. A drain outlet 12 is provided at the rearmost bottom of the water tub 2. The drain outlet 12 is connected to a drain valve 13 outside the water tub 2 which drain valve 13 is further connected to a drain hose 14 to provide outlet of water inside the water tub 2 to the machine exterior.

Further, a reinforcing element 15 is mounted on the back side of the rotational tub 3 rear surface and a rotary shaft 16 penetrates reward through the center of the reinforcing element 15. A plurality of warm air intake perforations 17 are formed in the periphery of the rear end of the rotational tub 3.

A bearing housing 18 is mounted on the rear surface center of the water tub 2. The rotary shaft 16 is passed through the bearing housing 18 via bearings 19 and 20. Thus, the water tub 2 and the rotational tub 3 are supported coaxially and rotatably. Elastic support is provided by the water tub 2 by a suspension not shown in the cabinet 1. The water tub 2 is laterally disposed with its axis running in the longitudinal direction (left and right direction in FIG. 4), the front portion of the axis being slightly inclined upward. Support is provided for the rotational tub 3 in the like manner.

A stator 22 of a motor 21 is mounted on the outer periphery of the bearing housing 18. A rotor 23 is mounted on the rear end of the rotary shaft 16 to oppose the stator 22 from the outside. Motor 21 is, thus, a brushless DC motor of an outer-rotor type and drives the rotational tub 3 about the rotational shaft 16 by direct drive method.

A warm air cover 24 is attached on the rear end interior of the water tub 2. A plurality of relatively large warm air intakes 25 are defined on the reinforcing element 15, more specifically, in the peripheral portions of the rotary shaft 16. A sealing element 26 is attached on the outer periphery of the portion where the warm air intakes 25 are defined so as to be placed in pressed contact with the front face of the warm air cover 24. Thus a warm air passage 27 is established, providing airtight communication from a warm air inlet 11 to the warm air intake 25.

A platform 29 is placed below the water tub 2 (on the inner bottom surface of the cabinet 1) via a plurality of cushions 28. An air duct 30 is placed on the platform 29. The air duct 30 has an air suction 31 at its upper front end portion, and the warm air outlet 10 of the water tub 2 is connected to the air intake 31 via circulation duct 32 and a connection hose 33. The circulation duct 32 is configured to circumvent the left side of the bellows 7.

On the other hand, a casing 35 of a re-circulation blower 34 is connected to the rear end of the airflow duct 30. An exit 36 of the casing 35 communicates with the warm air inlet 11 of the tub 2 via a connection hose 37 and an air supply duct 38. The air supply duct 38 is configured to circumvent the left side of the motor 21.

An airflow passage 39 communicating with the warm air outlet 10 and the warm air inlet 11 of the water tub 2 is configured by the circulation duct 32, the connection hose 33, the airflow duct 30, the casing 35, the connection hose 37 and the air supply duct 38. The re-circulation blower 34 blows out the air inside the rotational tub 3 through the airflow passage 39 and re-circulates the air back into the rotational tub 3. The airflow 39 and the re-circulation blower 34 constitute a re-circulation unit 40 that re-circulates air inside the rotational tub 3.

The re-circulation blower 34 is configured by a centrifugal fan, for example, and a centrifugal impeller 34a is provided in the casing 35. The centrifugal impeller 34a is rotated by a motor 34b provided outside the casing 35.

The airflow duct 30 placed in the airflow passage 39 contains a filter 41, an evaporator 42, and a condenser 43 in listed sequence as viewed in the front-rear orientation of the airflow duct 39. The filter 41 collects lint carried by the air inside the rotational tub 3 flowing into the airflow duct 30 from the warm air outlet 10 of the water tub 2 via the circulation duct 32 and the connection hose 33. The evaporator 42 is configured by a meandering path configured by a copper-made refrigerant circulation pipe having a plurality of heat transfer fins made of aluminum, for example attached to it. The condenser 43 is also configured in the same manner and the air inside the rotational tub 3 flown into the airflow duct 30 passes through the heat transfer fins.

Figure 5:
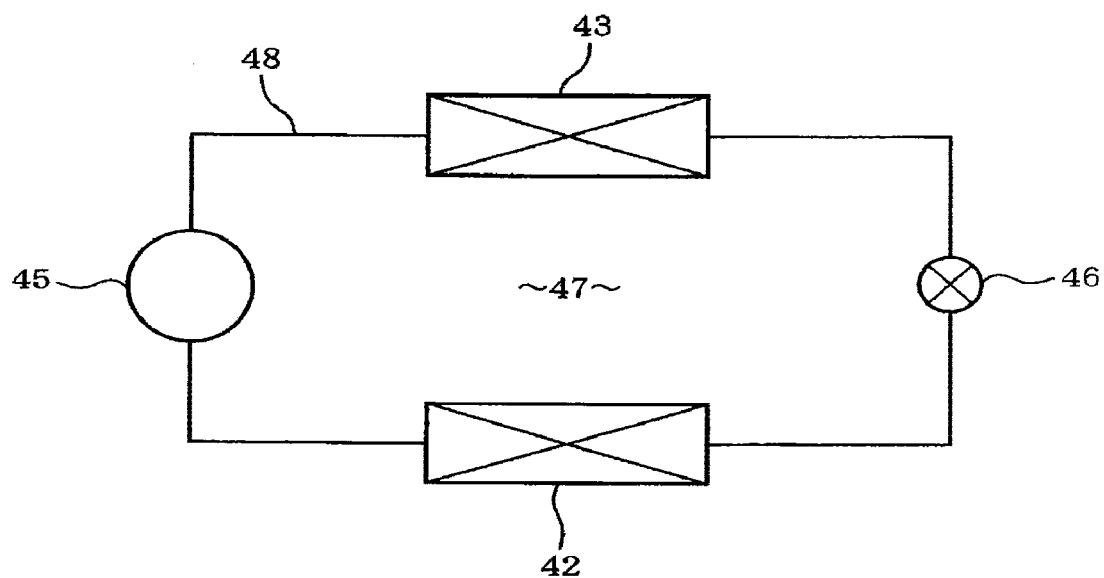
FIG. 5 is a heat pump cycle of the washer dryer.

Referring to FIG. 5, the heat pump 47 is configured by a compressor 45, a condenser 43, a valve 46, and the evaporator 42 connected by a connection pipe 48 in listed sequence to define a cooling cycle for circulating the refrigerant sealed in the connected components by activation of the compressor 45. A refrigerant for high-temperature use such as R134a is used as a refrigerant. As shown in FIG. 4, the compressor 45 is placed outside and in close proximity of the airflow duct 30. The valve 46 in the present exemplary embodiment is configured by an expansion valve (such as electronic expansion valve like PMV (Pulse Motor Valve)) and allows adjustment in valve opening.

A moisture outlet 49 is defined on the side surface of the airflow duct 30 situated between the air intake 31 and the evaporator 42, more specifically in a portion that faces the bottom 30a. The moisture outlet 49 is connected to the drain 50 defined on the lower side surface of the cabinet 1 via a connection pipe 51. The bottom surface of the airflow duct 30 is downwardly sloped toward the moisture outlet 49 at portion 30b located immediately below the evaporator 42.

A water supply valve 52 is placed on an upper portion of the cabinet 1 interior and has a plurality of exits that is connected to the water supplier 53 situated in the upper front portion of the cabinet 1 interior via connection pipes 54 and 55. Though only briefly shown, the water supplier 53 has a detergent and a softener intake. By selectively opening/closing the exit, the water supply valve 52 supplies water from the connection pipe 54 into the water tub 2 via the detergent intake of the water supplier 53 during wash, and likewise, supplies water from the connection pipe 55 into the water tub 2 via the softener intake of the water supplier 53 during final rinse.

The controller 56 is disposed in the rear side of the upper front portion of the cabinet 1 and is configured by a microcomputer, for example, to control the overall operation of the washer dryer. The controller 56 receives various input of operation signals from an operation input console composed of various operation switches provided in the operation panel (not shown), and the water level detection signal is inputted from the water level sensor provided for detecting the water level inside the water tub 2.

Further, the controller 56 receives input of temperature detection signals from the temperature sensors that detect the temperature of the entrance and exit of the evaporator 42, the condenser 43, and the refrigerant exhaust of the compressor 45. The controller 56 controls components such as the water supply valve 52, motor 21, the drain valve 13, the compressor 45, the valve 46, the motor 34b for re-circulation blower 34, and a compressor blower for cooling the compressor 45 via drive circuits (not shown) based on the aforementioned various input signals and the pre-stored control programs.

Figure 1A:
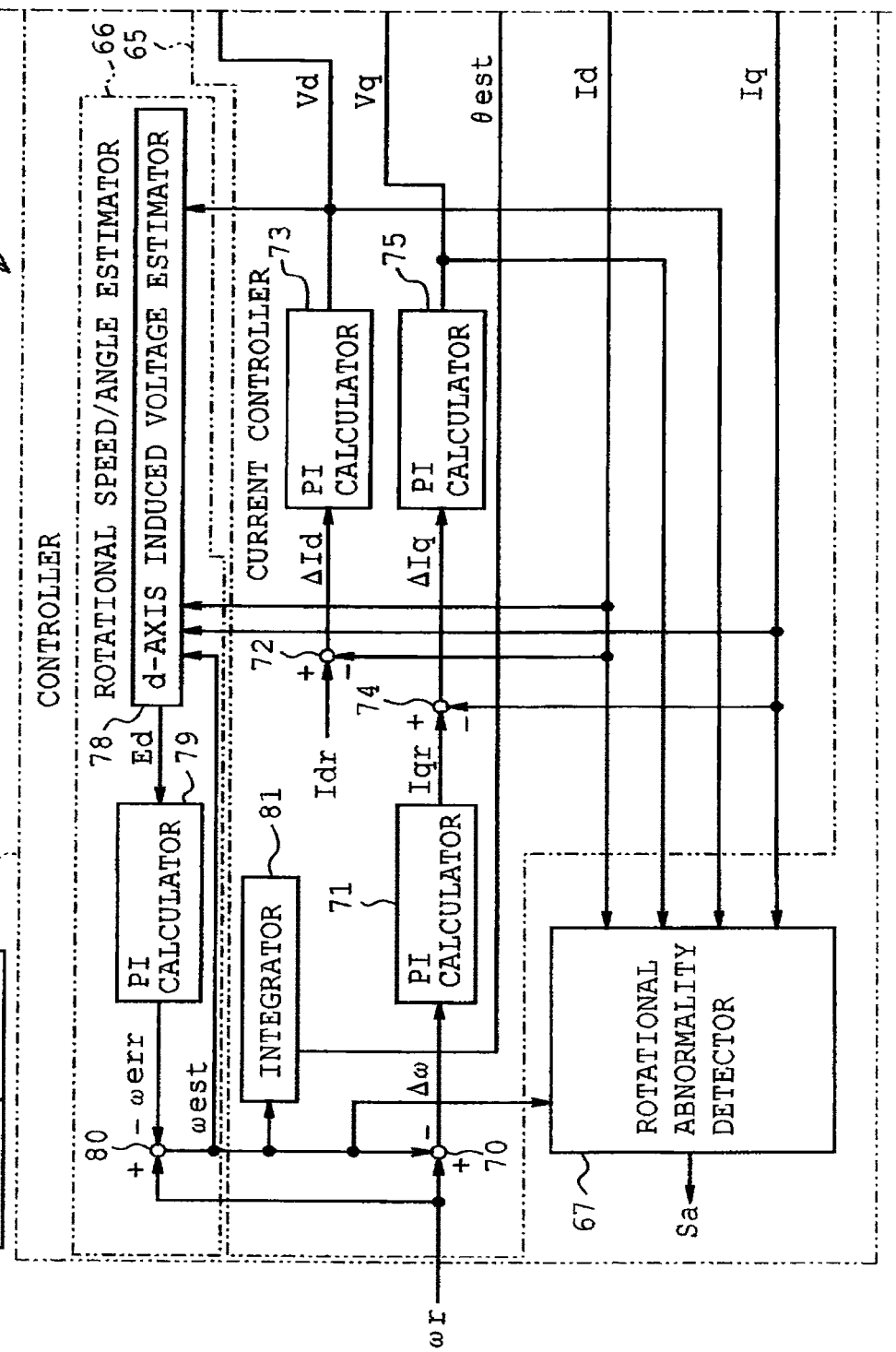
FIGS. 1A and 1B are block diagrams illustrating the electrical configuration of a motor controller according to a first exemplary embodiment of the present disclosure.
Figure 1B:
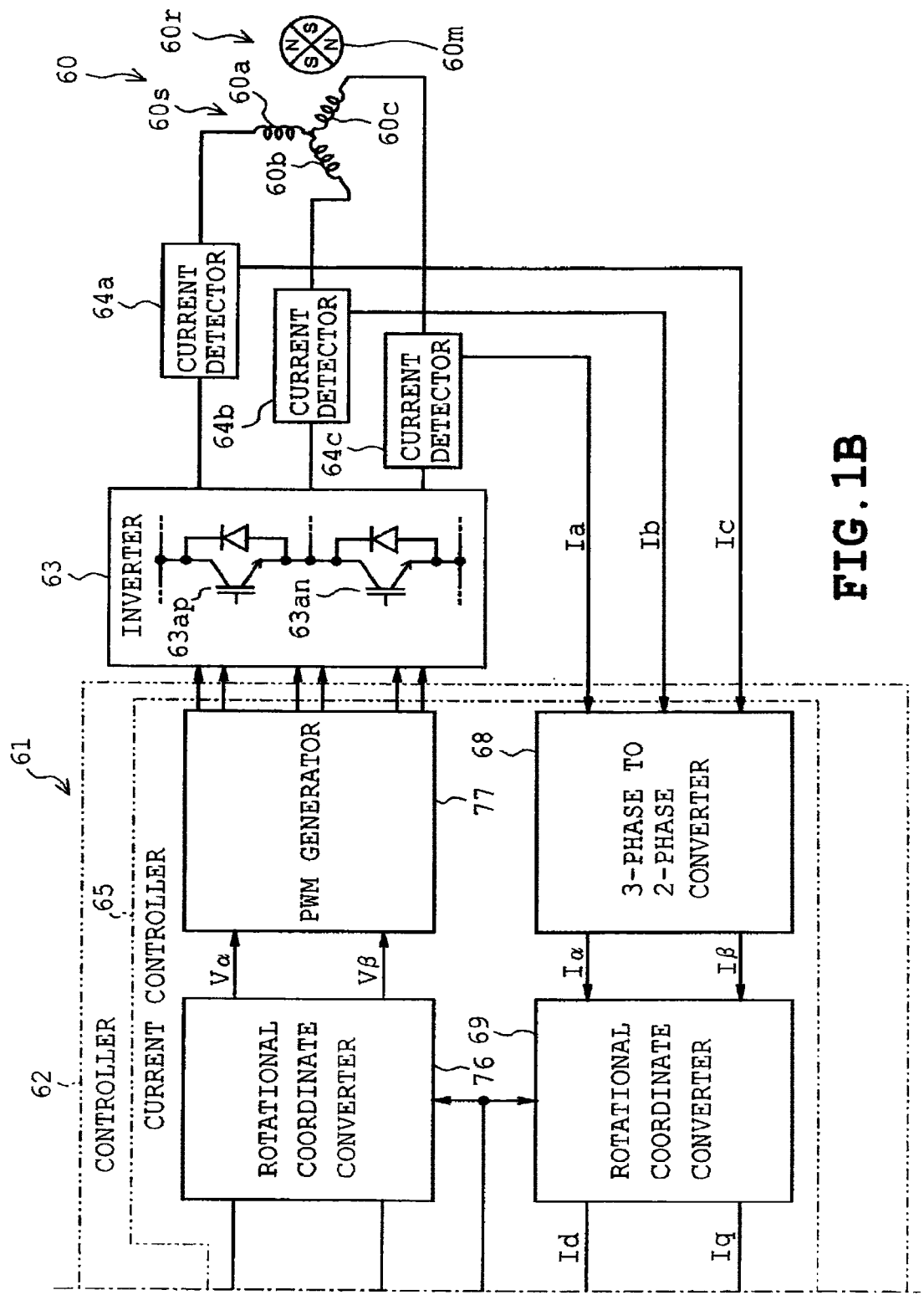

FIGS. 1A and 1B describe the configuration of the motor controller 61 in functional block diagram. The motor controller 61 controls the motor 60 housed in the compressor 45. FIGS. 1A and 1B illustrate the configuration during position estimation. Motor 60 being controlled by motor controller 61 is a 3-phase synchronous permanent magnet motor (PM motor) provided with a rotor 60r including a permanent magnet 60m and a stator 60s having armature windings 60a, 60b, and 60c wound to it. No sensor is provided for direct detection of the rotor 60r position. The motor controller 61 controls the motor 60 drive by the so-called sensor-less field-oriented control.

The motor controller 61 includes a controller 62, an inverter 63, and current detectors 64a, 64b, and 64c. The inverter 63 constituting a power converter is a well-known voltage type inverter having switching elements such as IGBT (Insulated Gate Bipolar Transistor) 63ap, 63an . . . and so on to a 3-phase bridge configuration. The current detectors 64a, 64b, and 64c constituted by elements such as hall CT, shunt resistor are provided between an output terminal of the inverter 63 and the terminal of motor 60.

The controller 62 is configured by a processor provided with basic components such as CPU core and memory; and peripheral circuits such as an A/D converter, a timer, input/output ports, and communication interface. The controller 62 controls motor 60 by executing control programs stored in nonvolatile memory such as flash memory. The controller 62 executes field-oriented control of motor 60 by controlling voltage and current under the dq coordinate system where d-axis represents magnetic flux and q-axis orthogonal to it represents torque.

The controller 62 functions as a current controller 65, a rotational speed/rotational angle estimator 66, and rotational abnormality detector 67. The rotational speed/rotational angle estimator 66 estimates rotational speed $\omega$ and magnetic pole position (rotational phase angle $\theta$) of the rotor 60r. The current controller 65 provides the inverter 63 with outputs of forcible commutation signals taking a predetermined energization pattern based on command rotational speed or during motor startup; whereas, during position estimation, the current controller 65 controls the phase and amount of current to be flown in the coil windings 64a, 64b, and 64c based on the rotational position estimate. When executing the startup and position estimation, the rotational abnormality detector 67 detects occurrence of lock at the rotor 60r or abnormal reduction in rotational speed by step-out or other causes.

A 3-phase to 2-phase converter 68 at the current controller 65 converts 3-phase currents Ia, Ib, and Ic detected by current detectors 64a, 64b, and 64c into their two-phase equivalents I$\alpha$ and I$\beta$. Also, a rotational coordinate converter 69 converts currents I$\alpha$ and I$\beta$ under the $\alpha\beta$ coordinate system into currents Id and Iq of the dq coordinate system. The rotational coordinate conversion utilizes rotor angle estimate $\theta$est estimated by the rotational speed/angle estimator 66 described afterwards in its calculation process.

The controller 62 receives input of command rotational speed $\omega$r. The command rotational speed $\omega$r is subtracted by rotational speed $\omega$est estimated by the rotational speed/rotational angle estimator 66 at the subtractor 70 to obtain speed error $\Delta\omega$. Then, proportional-integral (PI) calculation is performed on speed error $\Delta\omega$ at PI calculator 71 to obtain command q-axis current Iqr. The command d-axis current Idr takes a constant value (zero in the present exemplary embodiment).

A subtractor 72, on the other hand, obtains d-axis current error $\Delta$Id by subtracting the detected d-axis current Id from the command d-axis current Tdr. PI calculation is performed on d-axis current error $\Delta$Id at the PI calculator 73 to generate a command d-axis voltage Vd. In the like manner, a subtractor 74 obtains q-axis current error $\Delta$Iq by subtracting the detected q-axis current Iq from the command q-axis current Iqr. PT calculation is performed on q-axis current error $\Delta$Iq at the PI calculator 75 to obtain command q-axis voltage Vq.

The command d-axis voltage Vd and the command q-axis voltage Vq are converted at the rotational coordinate converter 76 by rotational coordinate conversion utilizing rotor angle $\theta$est to provide output of voltages V$\alpha$ and V$\beta$ of the $\alpha\beta$ coordinate system. Then, a commutation signal modulated by PWM modulation is generated based on the voltages V$\alpha$ and V$\beta$ at the PWM generator 77. Then, according to the generated commutation signal provided via drive circuits not shown, IGBT (represented by 63ap, 63a and so on) at the inverter 63 execute the switching operation. Thus, voltages corresponding to voltages V$\alpha$ and V$\beta$ are applied on the coils 60a, 60b, and 60c to rotate the motor 60.

The rotational speed/rotational angle estimator 66 obtains rotational speed $\omega$est and the rotor angle $\theta$est by the dq motor model. A d-axis component estimate Ed of induced voltage at coils 60a, 60b, and 60c caused by rotor 60r rotation is obtained by the following equation (1) at d-axis induced voltage estimator 78.

$$Ed=Vd-(R+pLd)\cdot Id+\omega est\cdot Lq\cdot Iq \quad (1)$$

In the above equation, R represents coil resistance for a single phase of motor 60; Ld and Lq represent d-axis and q-axis inductance for a single phase of motor 60; $\omega$est represents rotational speed estimate of rotor 60r; and p is a differential operator. Currents Id and Iq employ detected current values whereas d-axis voltage Vd employs command voltage instead of detected voltage because of the high-responsiveness provided by the inverter 63.

Then, at PI calculator 79, PI calculation is performed on d-axis component estimate Ed of induced voltage obtained from equation (1) to output rotational speed error Herr. As shown in the in following equation (2), the subtractor 80 obtains rotational speed $\omega$est by subtracting rotational speed error $\omega$err from command rotational speed $\omega$r.

$$\omega est=\omega r-\omega err \quad (2)$$

According to this estimation method, the d-axis component estimate Ed of induced voltage converges to zero. Then rotational speed $\omega$est obtained in equation (2) is integrated at integrator 81 to provide output of rotor angle $\theta$est.

Figure 2:
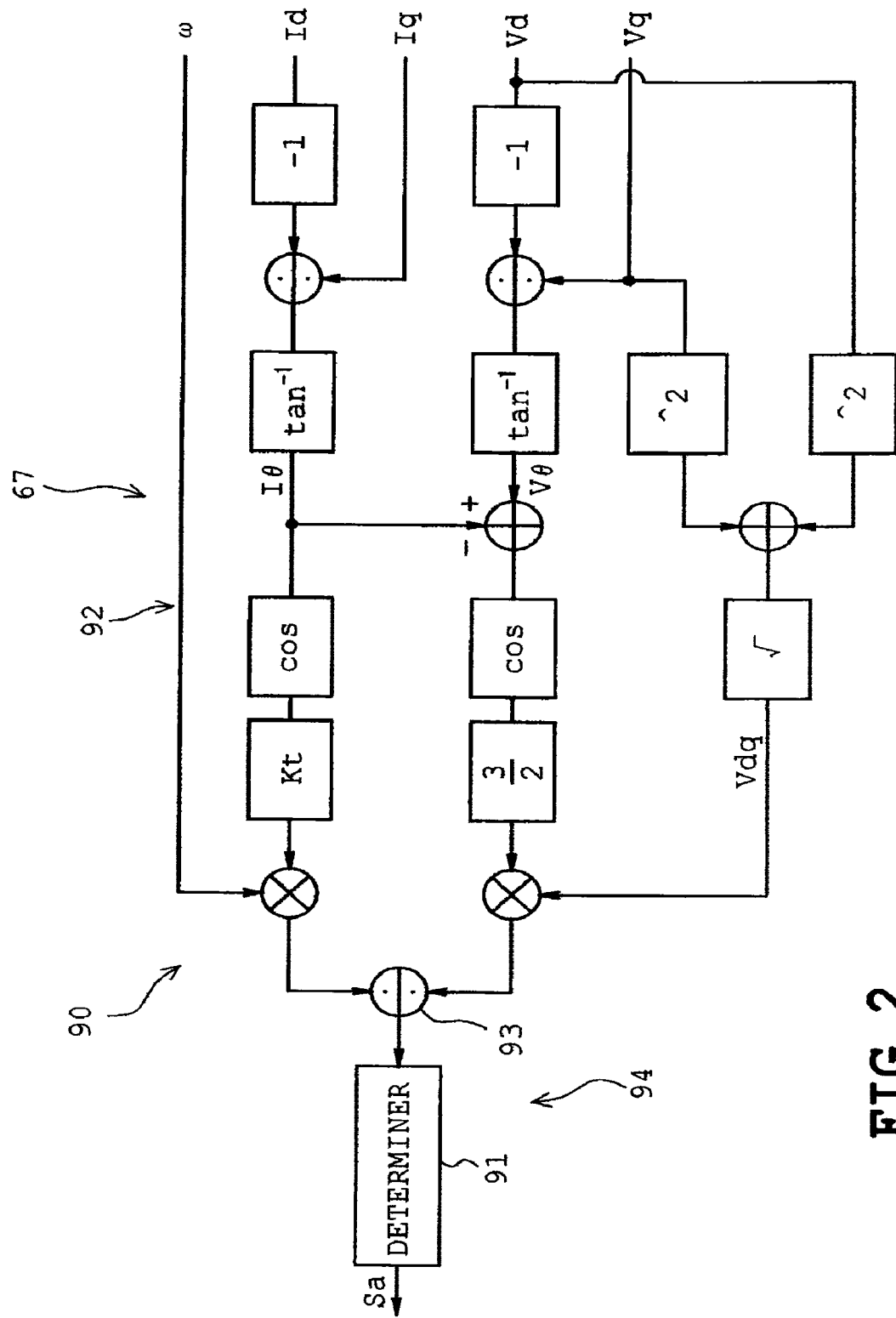
FIG. 2 is a block diagram of a rotational abnormality detector.

FIG. 2 indicates the configuration of the rotational abnormality detector 67. The rotational abnormality detector 67 comprises a rotational abnormality reference calculator 90 (hereinafter simply referred to as reference calculator 90) and a determining element 91 (determiner). The reference calculator 90 comprises an electricity calculator 92 corresponding to an input power calculator and an output power calculator, and a divider 93. The determiner 91 and the subtractor 93 constitute a rotational abnormality determiner 94 in the present exemplary embodiment.

The reference calculator 90 calculates rotational abnormality reference which provides a reference value serving as an index for determining occurrence of motor rotational abnormalities at motor 60. The rotational abnormality reference can be obtained by dividing the motor 60 output power by motor 60 input power as described in the following equation (3). In other words, rotational abnormality reference is the result of comparison between input power and output power of the motor 60.

$$\text{rotational abnormality reference} = \text{motor output power}/\text{motor input power} \quad (3)$$

The determiner 91 compares the rotational abnormality reference obtained in the above equation with a predetermined threshold (1, for example) and if the reference exceeds the threshold, the determiner outputs abnormal signal Sa indicating the occurrence of rotational abnormality. The current controller 65 stops the switching operation at the inverter 63 in response to the abnormal signal Sa.

The input power and output power of the motor 60 can be generally described by the following equations (4) and (5).

$$\text{motor input power} = 3/2 \cdot Vdq \cdot Idq \cdot \cos(V\theta - I\theta) \quad (4)$$

$$\text{motor output power} = \omega \cdot Kt \cdot Idq \cdot \cos(I\theta) \quad (5)$$

The above equations are to be interpreted such that Vdq indicates the amplitude[V] of voltage applied to the motor 60; Vθ, the phase [deg] of the applied voltage; Idq, the amplitude [A] of current flowing in windings 60a to 60c; Iθ, the phase [deg] of the current; ω, the rotational speed of the rotor 60r; Kt, the torque constant [Nm/A]; and cos(Vθ−Iθ), the power factor.

As indicated in equations (4) and (5), both input power and output power include the current amplitude Idq, and as described earlier in equation (3), the rotational abnormality reference is a quotient of the output power divided by input power. Thus, for simplification, the reference calculator 90 of the present exemplary embodiment calculates the rotational abnormality reference exclusive of current amplitude Idq as shown in the following equation (6).

$$\text{rotational abnormality reference} = \omega \cdot Kt \cdot \cos(I\theta)/(3/2 \cdot Vdq \cdot \cos(V\theta - I\theta)) \quad (6)$$

The reference calculator 90 calculates the denominator (corresponding to the input power of motor 60) of equation (6) from the actual voltage (substituted by command voltages Vd and Vq in the present exemplary embodiment) of the motor 60 and the detected currents Id and Iq. During position estimation, reference calculator 90 assigns command rotational speed ωest calculated by rotational speed/angle estimator 66 as rotational speed ω and calculates the numerator (corresponding to the output power of motor 60) of equation (6) by command rotational speed rest and the detected currents Id and Iq. During startup, the reference calculator 90 assigns command rotational speed ωr as rotational speed ω to calculate the numerator of equation (6) based on command rotational speed or and detected currents Id and Iq. In other words, the denominator of equation (6) is calculated based on detected value (or its substitute) and the numerator of equation (6) is calculated based on estimate (command value at startup).

The power factor includes a voltage phase Vθ and current phase Iθ both dependent on angle estimate θ of the rotor 60r. Since the equation obtains the difference between the voltage phase Vθ and current phase Iθ, power factor can be calculated free from the effect of estimation error.

Figure 3:
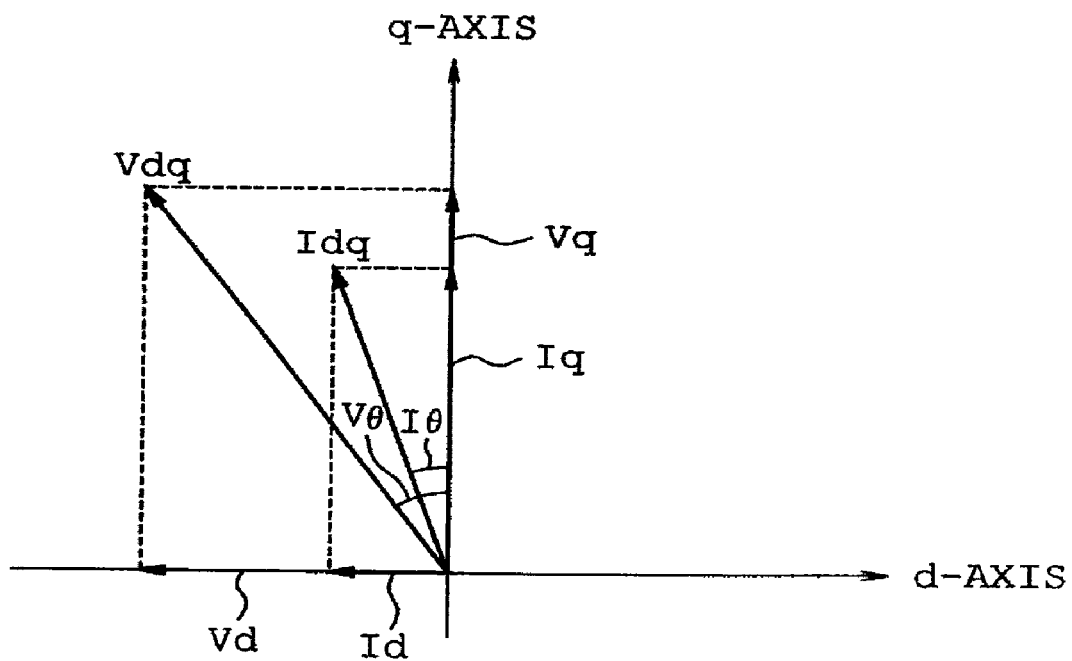
FIG. 3 is a vector diagram of voltage applied to the motor and current flowing in coil windings.

FIG. 3 is a vector diagram of voltage applied to the motor 60 versus current flowing in the windings. As can be seen from FIG. 3, voltage amplitude Vdq, current amplitude Idq, voltage phase Vθ, and current phase Iθ are represented by the following equations (7) to (10).

$$Vdq = (Vd^2 + Vq^2)^{1/2} \quad (7)$$

$$Idq = (Id^2 + Iq^2)^{1/2} \quad (8)$$

$$V\theta = \tan^{-1}(-Vd/Vq) \quad (9)$$

$$I\theta = \tan^{-1}(-Id/Iq) \quad (10)$$

The reference calculator 90 calculates voltage amplitude Vdq, voltage phase Vθ and current phase Iθ based on the above equations (7), (9), and (10) respectively.

Since current phase Iθ=0 when d-axis current Id=0 during position estimation, the reference calculator 90 is allowed to calculate rotational abnormality reference during position estimation by the following equation (11) which is a simplified alternative to equation (6).

$$\text{rotational abnormality reference} = \omega \cdot Kt/(3/2 \cdot Vdq \cdot \cos(V\theta)) \quad (11)$$

The reference calculator 90 may alternatively calculate the current amplitude Idq based on equation (8), then calculate input power and output power of motor 60 based on equations (4) and (5), and finally arrive at rotational abnormality reference from the obtained input power and output power.

Next, a description will be given on rotational abnormality detection at motor 60.

When motor 60 encounters rotational abnormalities such as step-out or unexpected stop during position estimation, rotational speed of motor 60 is reduced to deviate from the command speed. At this instance, when rotational speed/angle estimator 66 fails to accurately estimate the rotational speed reduction of motor 60, the rotational speed estimate ωest stays high without being reduced. Thus, the conventional methods that only employ estimates have failed to detect rotational abnormalities of motor 60. In contrast, the motor controller 61 of the present exemplary embodiment allows proper detection of rotational abnormalities of motor 60, even when accurate estimation of motor 60 rotational speed fails, by pursuing the following steps.

During position estimation, the reference calculator 90 assigns estimate ωest to rotational speed ω in equation (11) to calculate the rotational abnormality reference. In this case, the numerator of equation (11) being calculated based on estimate ωest stays high even when rotational abnormality occurs and motor 60 rotational speed is reduced.

On the other hand, the denominator of equation (11), having no direct relation with the calculation result at the rotational speed/angle estimator 66, and being calculated based on actual voltage applied on motor 60 windings and actual detected value of winding current, is therefore reduced according to reduction in actual motor rotational speed of motor 60. Consequently, the rotational abnormality reference calculated by the reference calculator 90 is gradually increased.

The denominator of equation (11) for calculating rotational abnormality reference corresponds to input power of motor 60; whereas the numerator corresponds to the output power of motor 60. Normally, the output power of motor 60 does not exceed its input power. Thus, occurrence of abnormality can be determined when rotational abnormality reference calculated by equation (11) exceeds 1. The determiner 91 thus, determines occurrence of rotational abnormality at motor 60 when the rotational abnormality reference exceeds the threshold 1, and outputs abnormal signal Sa. The current controller 65 stops the switching operation at inverter 63 in response to abnormal signal Sa.

The relation between input power and output power of motor 60 can be generally represented by the following equation (12).

$$\text{motor input power} = \text{motor output power} + 3 \cdot R \cdot (Idq/2^{1/2})^2 + \text{iron loss} \quad (12)$$

The second term of the right hand member of the equation represents copper loss and R represents a single phase of winding current of motor 60.

Figure 6:
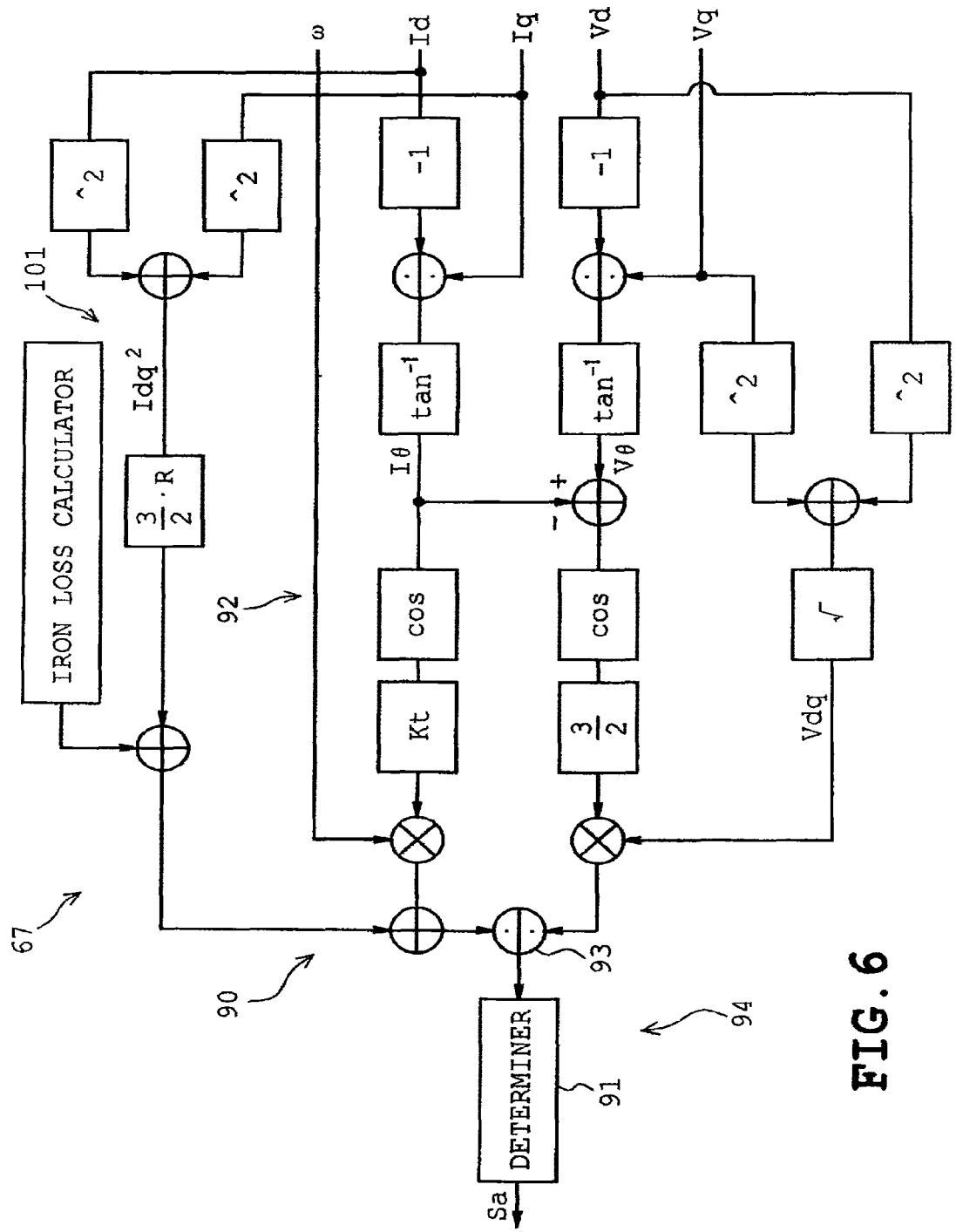
FIG. 6 is a block diagram of a rotational abnormality detector provided with a loss calculator.

When determining rotational abnormality of motor 60, rotational abnormalities can be detected more accurately by comparing the sum of the output power of motor 60 and motor losses such as copper loss and iron loss with input power of motor 60 as shown in equation (12). This is realized by providing a loss calculator 101 at the rotational abnormality detector 67 as shown in FIG. 6, to calculate copper loss and iron loss of motor 60 in accordance with equation (12). Under such configuration, the reference calculator 90 adds copper loss and iron loss of motor 60 calculated by the loss calculator 101 to the numerator of the right side member of equation (6) to obtain the rotational abnormality reference. According to such configuration, rotational abnormality of motor 60 can be detected more accurately as described above.

Of note is that rotational abnormality determination is performed during low-speed rotation where rotational abnormalities are prone to occur. Thus, iron loss is extremely small relative to motor input power/output power, and does not deteriorate determination accuracy even if iron loss is not considered. Also, when the above described losses are not considered for calculation, the rotational abnormality reference results in a smaller value, which advantageously reduces instances where normal rotation is erroneously determined as abnormal rotation. Further, eliminating the calculation of the above described losses advantageously simplifies the calculation process. Given the above advantages, the present exemplary embodiment takes the approach of disregarding the above described losses in rotational abnormality determination.

Rotational abnormalities can be similarly detected during startup. During startup, the current controller 65 executes startup of motor 60 at a stop and accelerates motor 60 to a rotational speed that allows the rotational speed/angle estimator 66 to properly estimate rotational speed ωest and rotor angle θest. In the startup, command d-axis current Idr is made constant and command q-axis current Iqr is set to 0 and forcible commutation is performed to increase rotor angle θ in accordance with command rotational speed ωr.

Thus, during startup, the reference calculator 90 calculates rotational abnormality reference by assigning command rotational speed ωr to rotational speed ω in equation (6). In this case, the numerator of equation (6) being calculated based on command rotational speed ωr stays high even when rotational abnormality occurs and motor 60 rotational speed is reduced.

The denominator of equation (6) on the other hand, having no direct relation with the calculation result at the rotational speed/angle estimator 66, is calculated based on actual voltage and applied on motor 60 windings and actual detected value of winding current, therefore is reduced according to reduction in actual motor 60 rotational speed. Consequently, the rotational abnormality reference calculated by the reference calculator 90 is gradually increased. Therefore, as in position estimation, the determiner 91 determines occurrence of rotational, abnormality at motor 60 when the rotational abnormality reference exceeds the threshold 1, and outputs abnormal signal Sa.

As described above, the motor controller 61 of the present exemplary embodiment is provided with a rotational abnormality detector 67. The rotational abnormality detector 67 calculates the value corresponding to input power of motor 60 based on actual value detected during position estimation, and calculates the value corresponding to output power of motor 60 based on rotational speed ωest estimated at the rotational speed/angle estimator 66. Then, the calculated results are compared to obtain the rotational abnormality reference. If the rotational abnormality reference is greater than the threshold, the rotational abnormality detector 67 determines the occurrence of rotational abnormality.

According to the above configuration, when rotational speed ωest cannot be estimated accurately during position estimation at the rotational speed/angle estimator 66, the rotational abnormality reference is increased to exceed the threshold, whereby the rotational abnormality de-Lector 67 determines occurrence of rotational abnormality at motor 60. Thus, rotational abnormalities can be detected even when calculation of estimate is not accurate.

When rotational abnormality detector 67 detects rotational abnormalities, the current controller 65 stops the switching operation at the inverter 63 and stops electric power supply to motor 60. Thus, excessive current flow at windings 60a to 60c and break-down of switching elements at the inverter 63 can be prevented.

The rotational abnormality detector 67 allows detection of rotational abnormalities of motor 60 during startup as well by using command rotational speed ωr instead of rotational speed ωest. Thus, reduction in rotation count due to rapid change in load such as lock and step-out can be detected promptly in startup inclusive sensor-less drive. Thus, break-down of the entire system incorporating motor 60 can be prevented.

Voltages applied to windings 60a to 60c of motor 60 have outstanding follow-up capabilities to command voltage. Thus, the rotational abnormality detector 67 may employ command voltages Vd and Vq instead of actual (detected) voltages as the voltages to be applied to motor 60, thereby allowing the voltage detector to be eliminated from the system.

Figure 7:
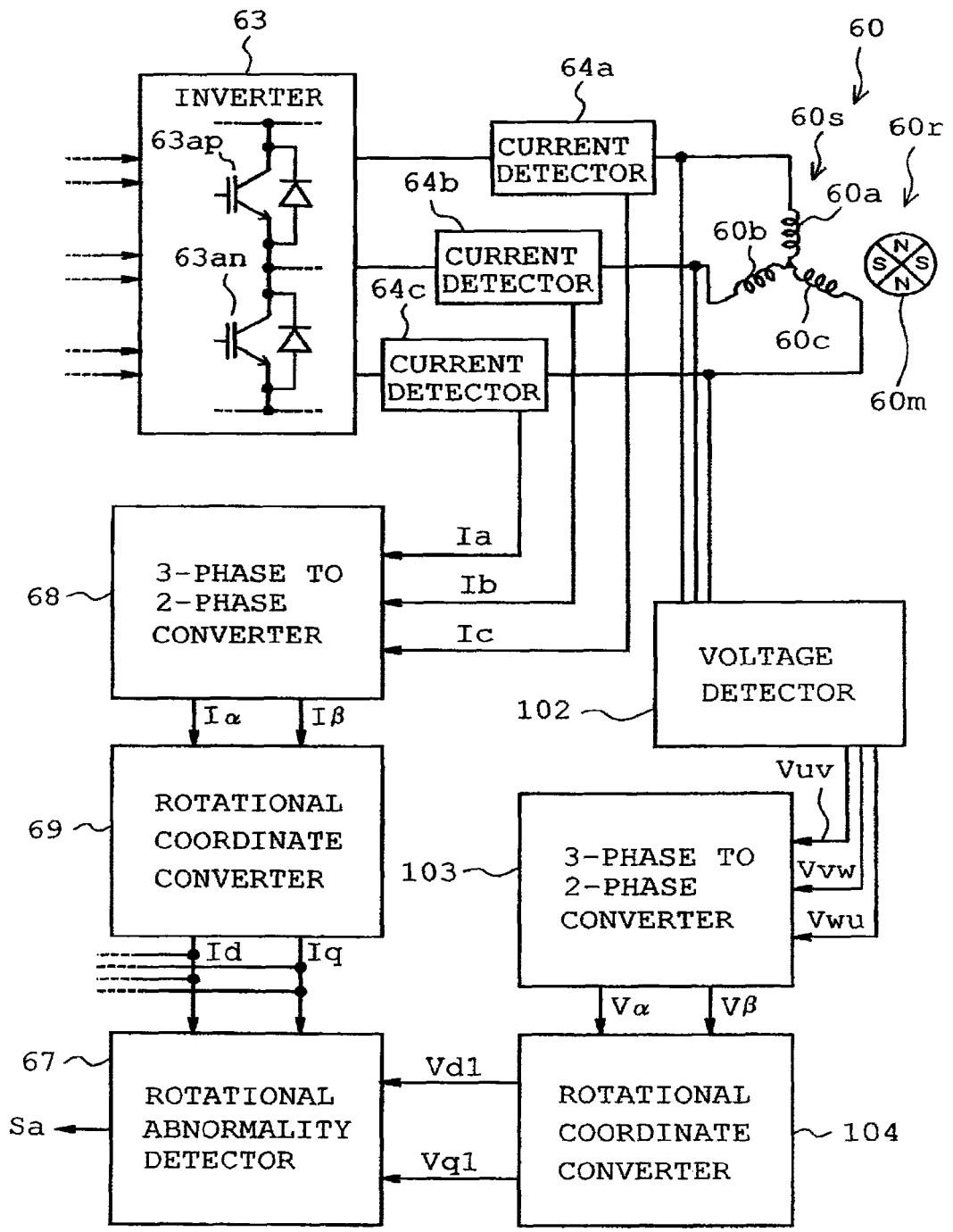
FIG. 7 is a block diagram illustrating a partial electrical configuration of a motor controller according to a second exemplary embodiment of the present disclosure.

FIG. 7 is a block diagram showing the electrical configuration of a portion of a motor controller according to a second exemplary embodiment of the present disclosure. FIG. 7 does not show corresponding components of the controller 62 other than the rotational abnormality detector 67, the 3-phase to 2-phase converter 68 and the rotational coordinate converter 69, for simplification. As shown in FIG. 7, a voltage detector 102, a 3-phase to 2-phase converter 103, and a rotational coordinate converter 104 are provided in the motor controller 61.

The voltage detector 102 detects voltage applied to the windings of motor 60. The 3-phase to 2-phase converter 103 converts line voltages $V_{uv}$, $V_{vw}$, and $V_{wu}$ to their 2-phase equivalents Vα and Vβ. The rotational coordinate converter 104 converts voltages Vα and Vβ of the αβ coordinate system to Vd1 and Vq1 of the dq coordinate system. The voltages Vd1 and Vq1 are given to the rotational abnormality detector 67 instead of the voltages Vd and Vq. In the present exemplary embodiment, the reference calculator 90 calculates rotational abnormality reference based on voltages Vd1 and Vq1 in other words, voltages detected by the voltage detector 102. Thus, the present exemplary embodiment achieves the operation and effects of the first exemplary embodiment.

The present disclosure is not limited to the above descriptions and illustrations in the accompany drawings but may be modified or expanded as follows.

The method of estimating rotational speed ζest and rotational position θest is not limited to the method provided by the rotational speed/angle estimator 66 in which the d-axis component estimate Ed of induced voltage is converged to zero.

The rotational abnormality detector 67 only requires that occurrence of rotational abnormality at motor 60 is determined based on comparison of input power of motor 60 calculated based on actually detected value with the output power of motor 60 calculated based on estimate. Accordingly, the rotational abnormality detector 67 may determine the occurrence of rotational abnormality based on the difference between the aforementioned input power and output power, for example.

The threshold for comparison with the rotational abnormality reference at the determiner 91 is not limited to 1, but may employ other values that allow prompt detection of rotational abnormalities. Also, an efficiency table indicating the efficiency at each load point may be prepared and stored based on T-N (torque-rotational speed) properties depending on the motor 60 being used so that the threshold is changed depending on the changes in efficiency. Such arrangement allows optimal detection of rotational abnormalities depending on the operation status of motor 60.

The present disclosure is not limited to motor control of compressor motors used in washer dryers, but may be employed in control of motor 21 that produces rotational drive for wash, rinse, and dehydration of washer dryers. The present disclosure may be applied to any configuration that controls motor drive by sensor-less field-oriented control.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A motor controller, comprising:
   a power converter configured to energize a motor based on a commutation signal, the motor including a rotor including a permanent magnet and a coil-wound stator;
   an estimator configured to estimate a rotor rotational speed and a rotor rotational position;
   a controller configured to output the commutation signal to the power converter, the commutation signal taking a predetermined energization pattern based on a command rotational speed during startup, and being outputted based on the rotational position estimated by the estimator during position estimation;
   a current detector configured to detect current flowing in the coil winding;
   an input power calculator configured to calculate a value corresponding to an input power of the motor by a voltage applied to the coil winding and the current detected by the current detector;
   an output power calculator configured to calculate a value corresponding to an output power of the motor by the rotational speed estimated by the estimator; and
   a rotational abnormality determiner configured to determine occurrence of rotational abnormality based on comparison of the value corresponding to the input power calculated by the input power calculator with the value corresponding to the output power calculated by the output power calculator,
   wherein the rotation abnormality determiner is configured to determine occurrence of rotation abnormality based on rotation abnormality reference obtained by dividing the value corresponding to the output power calculated by the output power calculator by the value corresponding to the input power calculated by the input power calculator as represented by equation:

rotation abnormality reference=$\omega \cdot Kt \cdot \cos(I\theta)/((3/2) \cdot Vdq \cdot \cos(V\theta - I\theta))$, in which Vdq indicates an amplitude of voltage applied to the coil winding, Vθ indicates a phase of the voltage applied to the coil winding, Iθ indicates a phase of the current flowing in the coil winding, ω indicates a rotational speed of the rotor, and Kt indicates a torque constant.

2. The motor controller of claim 1, wherein the rotational abnormality determiner is configured to determine occurrence of rotational abnormality when the rotational abnormality reference is greater than 1.

3. The motor controller of claim 1, further comprising a voltage detector is configured to detect the voltage applied to the coil winding, and the input power calculator is configured to calculate the value corresponding to the input power of the motor by actual voltage detected by the voltage detector and actual current detected by the current detector.

4. The motor controller of claim 1, wherein the input power calculator is configured to calculate the value corresponding to the input power of the motor by a command voltage applied to the coil winding and the actual current detected by the current detector.

5. The motor controller of claim 1, wherein the motor is adapted for use in a compressor of a heat pump provided in a washing machine to generate warm air for laundry dry.

6. A washing machine, comprising:
   a rotational tub that accommodates laundry;
   a heat pump that includes a compressor housing a motor and that is configured to generate warm air;
   a re-circulator configured to re-circulate the warm air generated by the heat pump into the rotational tub;
   a motor controller including a power converter configured to energize the motor based on a commutation signal, the motor including a rotor including a permanent magnet and a coil-wound stator; an estimator configured to estimate a rotor rotational speed and a rotor rotational position; a controller configured to output the commutation signal to the power converter, the commutation signal taking a predetermined energization pattern based on a command rotational speed during startup, and being outputted based on the rotational position estimated by the estimator during position estimation; a current detector configured to detect current flowing in the coil winding; an input power calculator that calculates a value corresponding to an input power of the motor by a voltage applied to the coil winding and the current detected by the current detector; an output power calculator configured to calculate a value corresponding to an output power of the motor by the rotational speed estimated by the estimator; and a rotational abnormality determiner configured to determine occurrence of rotational abnormality based on comparison of the value corresponding to the input power calculated by the input power calculator with the value corresponding to the output power calculated by the output power calculator,
   wherein the rotation abnormality determiner is configured to determine occurrence of rotation abnormality based on rotation abnormality reference obtained by dividing the value corresponding to the output power calculated by the output power calculator by the value corresponding to the input power calculated by the input power calculator as represented by equation:

$$\text{rotation abnormality reference} = \omega \cdot Kt \cdot \cos(I\theta)/((3/2) \cdot Vdq \cdot \cos(V\theta - I\theta)),$$

in which Vdq indicates an amplitude of voltage applied to the coil winding, V$\theta$ indicates a phase of the voltage applied to the coil winding, I$\theta$ indicates a phase of the current flowing in the coil winding, $\omega$ indicates a rotational speed of the rotor, and Kt indicates a torque constant.

7. A washing machine, comprising:

a motor configured to exert rotational drive force for wash, rinse, and dehydration; and a motor controller including a power converter configured to energize the motor based on a commutation signal, the motor including a rotor including a permanent magnet and a coil-wound stator; an estimator configured to estimate a rotor rotational speed and a rotor rotational position; a controller configured to output the commutation signal to the power converter, the commutation signal taking a predetermined energization pattern based on a command rotational speed during startup, and being outputted based on the rotational position estimated by the estimator during position estimation; a current detector configured to detect current flowing in the coil winding; an input power calculator configured to calculate a value corresponding to an input power of the motor by a voltage applied to the coil winding and the current detected by the current detector; an output power calculator configured to calculate a value corresponding to an output power of the motor by the rotational speed estimated by the estimator; and a rotational abnormality determiner is configured to determine occurrence of rotational abnormality based on comparison of the value corresponding to the input power calculated by the input power calculator with the value corresponding to the output power calculated by the output power calculator, wherein the rotation abnormality determiner is configured to determine occurrence of rotation abnormality based on rotation abnormality reference obtained by dividing the value corresponding to the output power calculated by the output power calculator by the value corresponding to the input power calculated by the input power calculator as represented by an equation:

$$\text{rotation abnormality reference} = \omega \cdot Kt \cdot \cos(I\theta)/((3/2) \cdot Vdq \cdot \cos(V\theta - I\theta)),$$

in which Vdq indicates an amplitude of voltage applied to the coil winding, V$\theta$ indicates a phase of the voltage applied to the coil winding, I$\theta$ indicates a phase of the current flowing in the coil winding, $\omega$ indicates a rotational speed of the rotor, and Kt indicates a torque constant.

* * * * *